(12) United States Patent
Ito (10) Patent No.: US 9,476,735 B2
(45) Date of Patent: Oct. 25, 2016

(54) MAGNETIC ENCODER AND BEARING DEVICE INCLUDING MAGNETIC ENCODER

(71) Applicant: NAKANISHI METAL WORKS CO., LTD., Osaka-shi (JP)

(72) Inventor: Yoshihiro Ito, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 23 days.

(21) Appl. No.: 14/499,874

(22) Filed: Sep. 29, 2014

(65) Prior Publication Data

US 2015/0117806 A1 Apr. 30, 2015

(30) Foreign Application Priority Data

Oct. 24, 2013 (JP) ................. 2013-220905

(51) Int. Cl.
*F16C 41/00* (2006.01)
*F16C 19/18* (2006.01)
*G01D 5/14* (2006.01)
*G01D 5/12* (2006.01)
*G01P 3/487* (2006.01)
*B29C 45/14* (2006.01)
*G01P 3/44* (2006.01)
*F16C 33/72* (2006.01)

(52) U.S. Cl.
CPC ............. *G01D 5/12* (2013.01); *B29C 45/1459* (2013.01); *B29C 45/14311* (2013.01); *F16C 41/007* (2013.01); *G01D 5/145* (2013.01); *G01P 3/443* (2013.01); *G01P 3/487* (2013.01); *B29K 2995/0008* (2013.01); *F16C 19/186* (2013.01); *F16C 33/723* (2013.01); *F16C 2326/02* (2013.01)

(58) Field of Classification Search
CPC F16C 2326/02; F16C 33/723; F16C 19/186; F16C 41/007; G01D 5/12; G01D 5/145; G01P 3/443; G01P 3/487; B29C 45/14311; B29C 45/1459
See application file for complete search history.

(56) References Cited

U.S. PATENT DOCUMENTS 7,592,798 B2 * 9/2009 Yabe ..................... F16C 19/186
                                                           324/174
7,671,582 B2 * 3/2010 Yabe ................... F16C 33/7879
                                                           324/174

(Continued)

FOREIGN PATENT DOCUMENTS

JP    2005-233321 A1    9/2005
JP    2006090956 A  *   4/2006

(Continued)

*Primary Examiner* — Alan B Waits
(74) *Attorney, Agent, or Firm* — Kratz, Quintos & Hanson, LLP (57) ABSTRACT

A magnetic encoder 1 including a support member 2 attached to a rotating body 12 and a magnet member 3 fixed to the support member 2, the support member 2 and the magnet 4 are not attached to each other using an adhesive but the support member 2 and the plastic magnet 4 are joined together by molding shrinkage or wrap-around form of the magnet 4, and the material for the magnet 4 is selected such that the value of the ratio $((\alpha p - \alpha m)/\epsilon c)$ of a difference $(\alpha p - \alpha m)$ between flowing-direction linear expansion coefficient $(\alpha p)$ of the magnet 4 and linear expansion coefficient $(\alpha m)$ of the support member 2, to tensile breaking strain $(\epsilon c)$ of the material for the magnet 4 is equal to or less than a value beginning at a threshold (Nth) based on a prescribed value of cycle member at thermal shock destructive test.

2 Claims, 7 Drawing Sheets

(56) References Cited

U.S. PATENT DOCUMENTS

| | | | |
|---|---|---|---|
| 8,393,795 B2* | 3/2013 | Aritake | F16C 33/768 384/448 |
| 2010/0027927 A1* | 2/2010 | Koyagi | F16C 19/186 384/448 |
| 2010/0061671 A1* | 3/2010 | Norimatsu | B60B 27/0005 384/448 |

FOREIGN PATENT DOCUMENTS

| | | | | |
|---|---|---|---|---|
| JP | 2007-271506 A1 | 10/2007 | | |
| JP | 2008122219 A | * | 5/2008 | |
| JP | EP 2003424 A2 | * | 12/2008 | G01D 5/2451 |
| JP | 2009198420 A | * | 9/2009 | |
| JP | 2011081008 A | * | 4/2011 | |
| JP | 2012-93125 A1 | 5/2012 | | |

* cited by examiner

Number of cycles at thermal shock destructive test

Fig. 7

Axial binding force between plastic magnet and support member

Fig. 8

MAGNETIC ENCODER AND BEARING DEVICE INCLUDING MAGNETIC ENCODER

TECHNICAL FIELD

The present invention relates to a magnetic encoder that is used to detect the rotating speed (number of rotations) of a rotating body, and a bearing device including the magnetic encoder.

BACKGROUND ART

The magnetic encoder device used to detect the rotating speed (number of rotations) of a rotating body has a variety of number of applications and is composed of: a magnetic encoder including an annular support member for attachment to the rotating body and an annular magnet member that is fixed to the support member and has N and S poles magnetized circumferentially at regular intervals in a multipolar manner; and a sensor that is attached to a non-rotating body so as to be opposed to the magnet member for detecting rotation of the magnet member.

As the magnet member of the magnetic encoder, a rubber magnet is widely used but also a plastic magnet is used for the purpose of improvement in detection accuracy with increase of magnet force and the like. Specifically, an annular plastic magnet is injection-molded, a thermoset adhesive is applied to an adhesion surface of the annular plastic magnet, and the annular plastic magnet is adhered to a support member to form a magnetic encoder (for example, refer to Patent Document 1), or an annular plastic magnet is injection-molded with a support member as an insert while a thermoset adhesive is applied to a joint surface of the insert with respect to the plastic magnet, thereby to form a magnetic encoder having a wrap-around portion at the outer peripheral side (for example, refer to Patent Document 2), or an annular plastic magnet is injection-molded with, as an insert, a support member having a large number of radiation grooves opened in an inner-diameter direction in a joint surface with respect to an annular plastic magnet while no thermoset adhesive is applied to the joint surface, thereby to form a magnetic encoder having a wrap-around portion at the inner peripheral side (for example, refer to Patent Document 3).

CITATION LIST

Patent Literatures

Patent Document 1: JP-A No. 2005-233321
Patent Document 2: JP-A No. 2012-093125
Patent Document 3: JP-A No. 2007-271506

SUMMARY OF INVENTION

Technical Problem

To form the magnetic encoders described in Patent Documents 1 and 2, there is necessary to perform the process for applying a thermoset adhesive to the annular magnet member (annular plastic magnet) or annular support member. This leads to an increase in manufacturing costs.

In addition, to form the magnetic encoder described in Patent Document 1, there is necessary to perform the drying process for setting the adhesive, which resulting in further increase of manufacturing costs.

Moreover, the magnetic encoder described in Patent Document 2 has the wrap-around portion at the outer circumferential side of the annular magnet member. Thus, if there occurs a large molding shrinkage after thermal setting of the adhesive or happens a great change in the temperature of usage environment (for example, a change of about −40° C. to 120° C. at the magnetic encoder for use in a rotating speed detection device for automobile wheel), a shrinkage resulting from the temperature change may generate a prescribed value or more of stress (strain) on the annular plastic magnet and thus breaks the same.

Meanwhile, the magnetic encoder described in Patent Document 3 does not need the use of an adhesive and has the wrap-around portion at the inner peripheral side of the annular magnet member, which does not cause the foregoing problem.

However, in the magnetic encoder described in Patent Document 3, the support member and the magnet member are not adhered to each other, the annular magnet member has no wrap-around portion at the outer peripheral side but has the wrap-around portion at the inner peripheral side, and has the support member with the large number of radiation grooves opened in the inner-diameter direction.

Accordingly, the annular magnet member may shift inward in a radial direction due to a molding shrinkage or temperature change as described above. In addition, since the thickness of the annular magnet member is not uniform, the radially outer part of the annular magnet member may become warped upward to generate a pitch error or the like and decrease detection accuracy.

In addition, there is the need to form the large number of radiation grooves in the flange part of the annular support member by press work or the like, which leads to an increase in manufacturing costs.

Accordingly, to solve the problem in light of the foregoing circumstances, an object of the present invention is to provide a magnetic encoder formed by injection-molding an annular magnet member (annular plastic magnet) with an annular support member as an insert, wherein the magnetic encoder is configured such that the annular support member and the annular magnet member are not adhered to each other, the annular support member is not processed to have radiation grooves or the like, and the magnetic encoder can be used without decrease in detection accuracy even in environments with great temperature changes.

Solution to Problem

Taking particular note of the foregoing problems, the inventor of the present invention has conduct earnest studies on realization of a magnetic encoder manufactured by injection-molding an annular magnet member (annular plastic magnet) with an annular support member as an insert, the magnetic encoder being usable without decrease in detection accuracy even in environments with great temperature changes, without increase in manufacturing costs.

Then, the inventor has examined various shapes of a magnetic encoder in which an annular support member and an annular magnet member are not adhered to each other and the annular support member is not processed to have radiation grooves or the like, and has evaluated various binders and additives for the magnetic encoder, and then finally has completed the present invention.

Specifically, to solve the foregoing problems, the magnetic encoder according to the present invention includes an annular support member that is formed from a steel plate and attached to a rotating body and an annular magnet member that is fixed to the support member and has N and S poles magnetized circumferentially at regular intervals in a multipolar manner, wherein the magnet member is a plastic magnet, there is no adhesive layer between the support member and the plastic magnet, the support member and the plastic magnet are joined together by molding shrinkage of the plastic magnet or wrap-around form of the plastic magnet, and the material for the plastic magnet is selected such that the value of the ratio $((\alpha p-\alpha m)/\epsilon c)$ of a difference $(\alpha p-\alpha m)$ between flowing-direction linear expansion coefficient $(\alpha p)$ of the plastic magnet and linear expansion coefficient $(\alpha m)$ of the support member, to tensile breaking strain $(\epsilon c)$ of the material for the plastic magnet is equal to or less than a value beginning at a threshold (Nth) based on a prescribed value of cycle number at thermal shock destructive test, and tensile strength $(\sigma c)$ of the plastic magnet is equal to or more than a value beginning at a threshold (Fth) based on a prescribed value of axial binding force between the plastic magnet and the support member.

According to the foregoing configuration, since there is no adhesive layer between the support member and the plastic magnet, the support member and the plastic magnet are joined together by molding shrinkage of the plastic magnet or wrap-around form of the plastic magnet, which eliminates the need for a process of applying a thermoset adhesive. This makes it possible to reduce manufacturing costs as compared to the configuration in which there is an adhesive layer between the support member and the plastic magnet.

In addition, since the support member has no radiation grooves or the like, the thickness of the annular magnet member becomes uniform and the radially outer portion of the annular magnet member does not warp upward. This makes it possible to prevent reduction in detection accuracy due to a pitch error or the like.

Further, since the difference $(\alpha p-\alpha m)$ between the flowing-direction linear expansion coefficient $(\alpha p)$ of the plastic magnet and the linear expansion coefficient $(\alpha m)$ of the support member is small, even if the annular magnet member does not have the wrap-around portion at the outer peripheral side but has the wrap-around portion at the inner peripheral side, a shift of the plastic magnet is suppressed with respect to the support member. This makes it possible to prevent reduction in detection accuracy due to a pitch error or the like.

Moreover, since the value of the ratio $((\alpha p-\alpha m)/\epsilon c)$ of the difference $(\alpha p-\alpha m)$ between the flowing-direction linear expansion coefficient $(\alpha p)$ of the plastic magnet and the linear expansion coefficient $(\alpha m)$ of the support member to the tensile breaking strain $(\epsilon c)$ of the material for the plastic magnet is equal to or less than the value beginning at the threshold (Nth) based on the prescribed value of the cycle number at thermal shock destructive test, the magnetic encoder has a prescribed value or more of resistance to a thermal stress generated from thermal shock or the like.

In addition, since the value of the tensile strength $(\sigma c)$ of the plastic magnet is equal to or more than a value beginning at the threshold (Fth) based on the prescribed value of the axial binding force between the plastic magnet and the support member, a prescribed value or more of strength is assured in the configuration in which the support member and the plastic magnet are joined together through the use of the molding shrinkage of the plastic magnet and the wrap-around form of the plastic magnet.

Accordingly, in the configuration in which there is no adhesive layer as a buffer and the support member and the plastic magnet are joined together through the use of the molding shrinkage of the plastic magnet and the wrap-around form of the plastic magnet, a prescribed value or more of stress (strain) does not occur at or break the annular plastic magnet even in the usage environments with great temperature changes.

It is preferred that the magnetic encoder is an axial type, and includes a joint portion resulting from molding shrinkage at a radially outer peripheral part of the plastic magnet and includes a joint portion resulting from a wrap-around form at a radially inner peripheral part of the plastic magnet.

According to this configuration, the magnetic encoder includes the joint portions at both the radially inner peripheral part and the radially outer peripheral part, which significantly reduces the risk of the magnet member falling off even in severe usage environments of the magnetic encoder, and thus highly increases the reliability of joint between the support member and the magnet member.

A bearing device according to the present invention includes the magnetic encoder and also includes a cup-shaped protective cover that is press-fitted into the outer ring of a bearing as a non-rotating body to cover the magnetic encoder.

According to the foregoing configuration of the bearing device, in addition to the foregoing advantages of the magnetic encoder, the magnetic encoder is covered by the protective cover press-fitted into the outer ring, which makes it possible to suppress breakage and change in magnetic characteristics of the magnetic encoder. In addition, the provision of the protective cover, instead of a seal member, makes it possible to reduce rotary torque of the bearing device.

Advantageous Effects of Invention

According to the magnetic encoder in the present invention as described above, the magnetic encoder is configured such that the annular support member and the annular magnet member are not adhered to each other and the annular support member is not processed to have radiation grooves or the like, which produces significant advantages that manufacturing costs can be reduced, a prescribed value or more of stress (strain) does not occur at the annular plastic magnet to break the annular plastic magnet even in the environments with great temperature changes, and detection accuracy is not decreased due to pitch error or the like.

BRIEF DESCRIPTION OF DRAWINGS

FIG. 3(a) is a vertical cross-sectional view and FIG. 3(b) is a perspective partial vertical cross-sectional view;

FIG. 8 is a vertical cross-sectional view of one example of a device for measuring the axial binding force between the plastic magnet and the support member.

DESCRIPTION OF EMBODIMENTS

Next, an embodiment of the present invention will be described below in detail with reference to the attached drawings. The present invention is not limited to the embodiment shown in the attached drawings but includes all of embodiments satisfying the requirements described in the claims.

Figure 1:
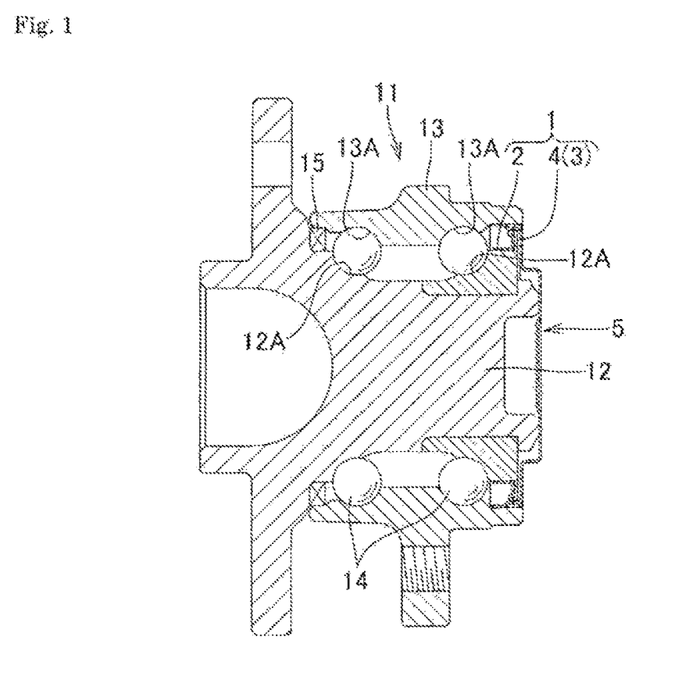
FIG. 1 is a vertical cross-sectional view of an example of a bearing device including a magnetic encoder according to an embodiment of the present invention.
Figure 2:
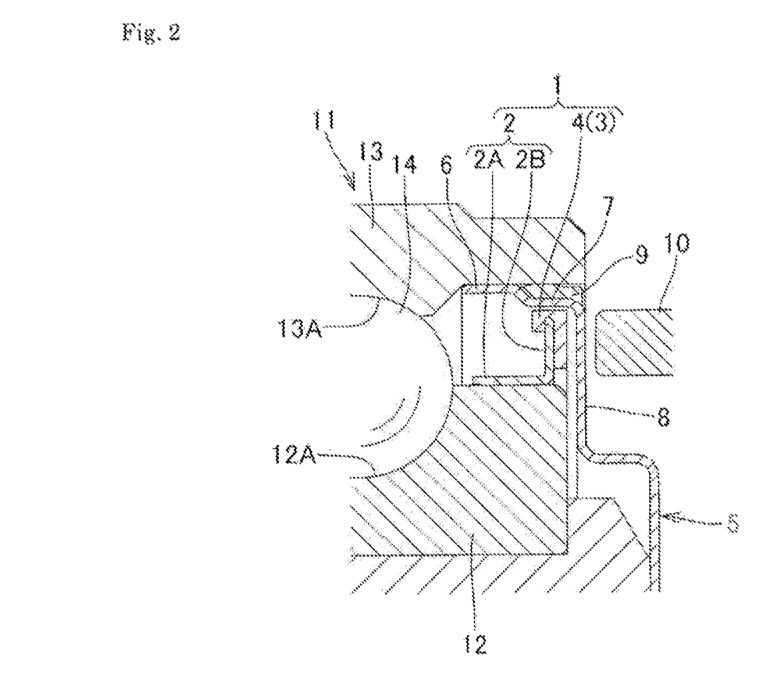
FIG. 2 is an enlarged vertical cross-sectional view of major components of the bearing device.

As shown in the vertical cross-sectional view of FIG. 1 and the enlarged vertical cross sectional view of major components of FIG. 2, a bearing device 11 including a magnetic encoder 1 according to the embodiment of the present invention includes: an inner ring 12 that has an inner ring track surface 12A on an outer peripheral surface; an outer ring 13 that has an outer ring track surface 13A on an inner peripheral surface; a bearing that has rolling elements 14, 14, . . . rolling between the inner ring track surface 12A and the outer ring track surface 13A, and others; the magnetic encoder 1 that is positioned at one axial end part of the bearing and is fixed to the inner ring 12; a sensor 10 that is fixed to the outer ring 13 and opposed to the magnetic pole of the magnetic encoder 1 to detect the rotation of the magnetic encoder 1; a cup-shaped protective cover 5 that is press-fitted into the outer ring 13 to cover the magnetic encoder 1 and intervenes between the magnetic encoder 1 and the sensor 10; and a seal member 15 that is arranged at the other axial end part of the bearing, and the like.

In this configuration, a rotating speed detection device is formed by the magnetic encoder 1 that is attached to the inner ring 12 at the rotary side and has N and S poles circumferentially magnetized at regular intervals in a multipolar manner and the sensor 10 that is attached to the outer ring 13 at the fixed side.

The interior of the bearing is sealed by the protective cover 5 and the seal member 15 at the both axial end parts of the bearing, and the magnetic encoder 1 is stored in the interior space. This makes it possible to protect the magnetic encoder 1 and the bearing interior from foreign matter and the like.

As shown in FIG. 2, the protective cover 5 is composed of a first cylindrical part 6 that is press-fitted into the outer ring 13, a second cylindrical part 7 that is smaller in diameter than the first cylindrical part 6 and is connected to the end edge of the first cylindrical part 6, an annular part 8 that is connected to the end edge of the second cylindrical part 7 and is extended inward in the radial direction, and a seal body 9 that is vulcanized and adhered to the outer peripheral surface of the second cylindrical part 7 and the like. All of the components except for the seal body 9 are formed by pressing stainless-steel plates.

In addition, the seal body 9 is an elastic body such as synthetic rubber and thus can improve airtightness between the protective cover 5 and the outer ring 13. The seal body 9 can be used as an appropriate blend of one or two or more kinds of rubbers from rubber materials with favorable oil resistance such as nitrite rubber (NBR), hydrogenated nitrile rubber (HNBR), acrylic rubber (ACM), ethylene-acrylic rubber (AEM), fluoro rubber (FKM, FPM), and silicone rubber (VQM).

According to the configuration of the bearing device 11 including the protective cover 5 as described above, since the magnetic encoder 1 is covered by the protective cover 5 press-fitted into the outer ring 13, it is possible to suppress breakage and changes in magnetic characteristics of the magnetic encoder 1. In addition, since the protective cover 5 is provided instead of a seal member (for example, refer to the seal member 15 described in Patent Document 1), it is possible to reduce rotary torque of the bearing device 11.

As shown in the vertical cross-sectional view of FIG. 1, the enlarged vertical cross-sectional view of major components of FIG. 2, the vertical cross-sectional view of FIG. 3(a), and the perspective partial vertical cross-sectional view of FIG. 3(b), the magnetic encoder 1 according to the embodiment of the present invention is composed of an annular support member 2 and an annular magnet member 3 that is fixed to the annular support member 2 and has N and S poles circumferentially magnetized at regular intervals in a multipolar manner.

In this configuration, the annular support member 2 is composed of a cylindrical part 2A and a flange part 2B extended from the end edge of the cylindrical part 2A outward in the radial direction, and is formed by pressing a stainless-steel plate.

In addition, the annular magnet member 3 is an annular plastic magnet 4 that is injection-molded with the annular support member 2 as an insert. Since there is no adhesive layer between the support member 2 and the plastic magnet 4, the support member 2 and the plastic magnet 4 are joined and integrated by a joint portion A resulting from molding shrinkage of the plastic magnet 4 and a joint portion B resulting from the wrap-around form of the plastic magnet 4.

The joint portion A resulting from molding shrinkage shown in FIGS. 3(a) and 3(b) is formed such that the resin is prone to shrink toward the inner diameter side when the plastic magnet 4 is injection-molded with the annular support member 2 as an insert, but the shrinkage is controlled by the outer peripheral edge of the steel flange part 2B and a stress (force of the resin tightening the flange part 2B) is generated between the joint portion A and flange part 2B for joint of the support member 2 and the plastic magnet 4.

In addition, the joint portion B resulting from the wrap-around form shown in FIGS. 3(a) and 3(b) is formed such that the resin wraps around from the front to back sides of the flange part 2B to join the support member 2 and the plastic magnet 4 in a geometric form in which the two will not disengage from each other.

The annular magnet member 3 (annular plastic magnet 4) is made of a magnet material containing magnetic substance powder, a binder, and an additive. The material is selected in the manner described later, The magnetic substance powder is preferably ferrite-based magnetic powder such as strontium ferrite or barium ferrite, or neodymium- or samarium-based rare-earth magnetic powder.

The binder is preferably a thermoplastic resin material such as polyamides (PA6, PA12, PA612, and the like) or polyphenylene sulfide (PPS).

The additive is preferably an organic additive such as carbon fiber, or an inorganic additive such, as glass beads, glass fiber, talk, mica, silicon nitride (ceramic), or crystalline (or non-crystalline) silica.

By changing the kind and mixture ratio of the additive, it is possible to adjust the annular magnet member 3 (annular plastic magnet 4) to reduce its linear expansion coefficient and increase its strength.

Next, variations of joint form of the support member 2 and the magnet member 3 in the magnetic encoder 1 will be described with reference to the enlarged vertical cross-sectional view of major components of FIG. 4 for the axial-type magnetic encoder 1, and the enlarged vertical cross-sectional view of major components of FIG. 5 for the radial-type magnetic encoder 1.

In the axial-type magnetic encoder 1, the shapes of the support member 2 shown in FIGS. 4(b) to 4(e) are different from that of the support member 2 shown in FIG. 3(a).

First, with regard to the axial-type magnetic encoder 1, FIG. 4(a) shows the state where there exists no joint portion B resulting from the wrap-around form in the configuration of FIG. 3(a), FIG. 4(b) shows the state where the joint portion B resulting from the wrap-around form is provided at the inner peripheral edge side of the flange part 2B of the annular support member 2, FIG. 4(c) shows the state where the joint portion A resulting from molding shrinkage and the joint portion B resulting from the wrap-around form are provided as in the configuration of FIG. 3(a) and a resin lock portion is provided at the inner peripheral edge side of the flange part 2B, FIG. 4(d) shows the state where the joint portion B resulting from the wrap-around form is provided at the inner peripheral edge side of the flange part 2B, and FIG. 4(e) shows the state where the joint portion A resulting from molding shrinkage is provided at the outer peripheral edge side of the flange part 2B and the joint portion B resulting from the wrap-around form is provided at the inner peripheral edge side of the flange part 2B.

As in the configuration of FIG. 4(e), the axial-type magnetic encoder 1 has the joint portion A resulting from molding shrinkage provided at the radially outer peripheral part of the plastic magnet 4 and the joint portion B resulting from the wrap-around form provided at the radially inner peripheral part of the plastic magnet 4, that is, the joint portions are included at both the radially outer peripheral part and the radially inner peripheral part. This significantly reduces the risk that the magnet member 3 falls off even in the severe usage environment of the magnetic encoder 1. Accordingly, the joint between the support member 2 and the magnet member 3 highly increases in reliability.

Next, with regard to the radial-type magnetic encoder 1, FIGS. 5(a) and 5(b) show the state where the joint portions A resulting from molding shrinkage are provided. These joint portions A resulting from molding shrinkage are formed such that the resin is prone to shrink toward the inner diameter side when the plastic magnet 4 is injection-molded with the annular support member 2 as an insert, but the shrinkage is controlled by the outer peripheral surface of the steel cylindrical part 2A and a stress (force of the resin tightening the cylindrical part 2A) is generated between the joint portion A and cylindrical part 2A for joint of the support member 2 and the plastic magnet 4.

FIG. 5(a) shows the joint form in which the resin covers the surface of the flange part 2B of the annular support member 2, and FIG. 5(b) shows the joint form in which the resin does not cover the surface of the flange part 2B of the annular support member 2.

In the radial-type magnetic encoder 1, a sensor for detecting rotation of the magnetic encoder 1 is arranged so as to be opposed to the magnetic pole of the magnetic encoder 1 on the radially outer side of the annular magnet member 3 (annular plastic magnet 4).

Next, selection of material for the annular plastic magnet 4 will be described.

The magnetic encoder 1 has the annular magnet member 3 (annular plastic magnet 4) attached to the support member 2. Thus, taking into account the use of the magnetic encoder 1 in environments with great temperature changes, it is preferred that a difference between the thermal expansion coefficient of the annular support member 2 and the thermal expansion coefficient of the annular plastic magnet 4 (difference ($\alpha p - \alpha m$) between flowing-direction linear expansion coefficient ($\alpha p$) of the plastic magnet 4 and linear expansion coefficient ($\alpha m$) of the support member 2) is small from the viewpoint of decreasing a thermal stress (strain) generated from thermal shock or the like.

In addition, it is preferred that the plastic magnet 4 is resistive to large strains and thus the tensile breaking strain ($\epsilon c$) is larger from the viewpoint of achieving flexibility for warding off a thermal stress generated by thermal shock or the like.

Figure 6:
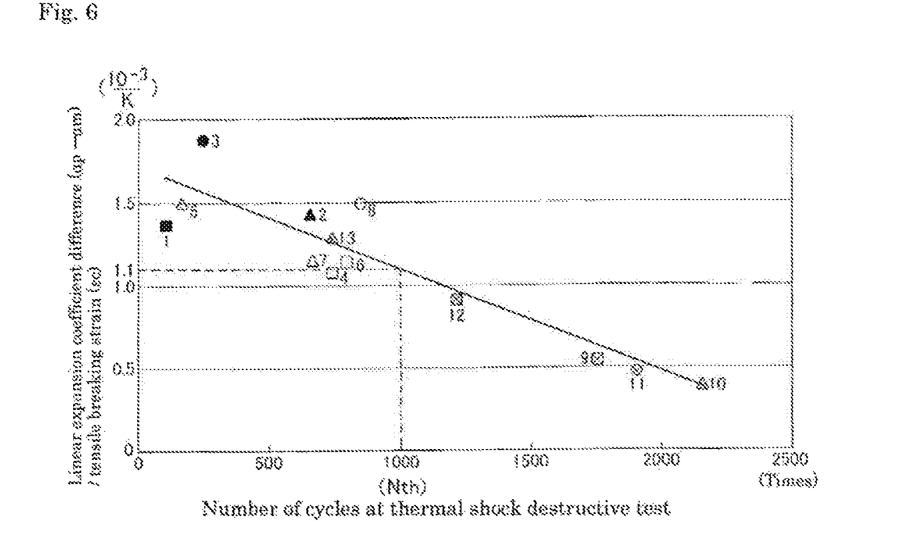
Figure 8:
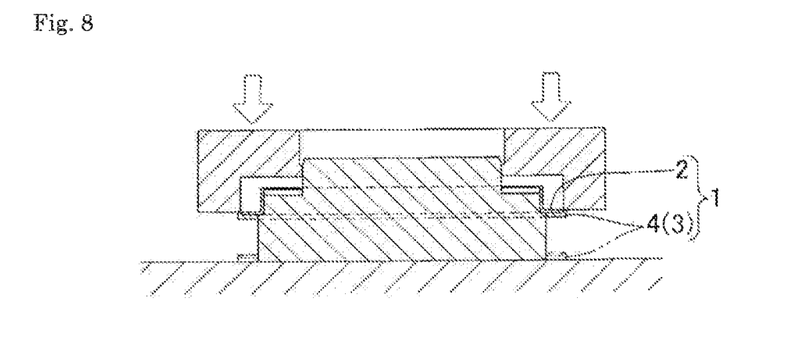
FIG. 8 is a diagram showing changes in the ratio $((\alpha p-\alpha m)/\epsilon c)$ of a difference $(\alpha p-\alpha m)$ between flowing-direction linear expansion coefficient ($\alpha p$) of the plastic magnet and linear expansion coefficient ($\alpha m$) of the support member to tensile breaking strain ($\epsilon c$) of the material for the plastic magnet, depending on the cycle number of thermal shock destructive test.

From the foregoing viewpoints, 13 kinds of magnet materials containing the foregoing magnetic substance powder, binder, and additive were prepared (refer to plot points 1 to 13 in FIG. 6). FIG. 6 is the plot of changes in the ratio ($\alpha e = (\alpha p - \alpha m)/\epsilon c$) of the difference ($\alpha p - \alpha m$) between the flowing-direction linear expansion coefficient ($\alpha p$) of the plastic magnet 4 and the linear expansion coefficient ($\alpha m$) of the support member 2 to the tensile breaking strain ($\epsilon c$) of the material for the plastic magnet 4, depending on the cycle number at thermal shock destructive test. FIG. 8 shows a downward tendency as indicated by a solid line.

The thermal shock destructive test shown in FIG. 8 was performed in cycles in each of which the materials were held in an environment at a temperature of 120° C. for 30 minutes and then held in an environment at a temperature of −40° C. for 30 minutes.

Referring to FIG. 8, the selection of material for the annular plastic magnet 4 can be made under the condition that the material takes a value equal to or less than one beginning at a threshold (Nth) based on the prescribed number of cycles at the thermal shock destructive test.

Specifically, for example, if the threshold (Nth) based on the prescribed value of cycle number at the thermal shock destructive test as the foregoing condition is 1000 (which is a general cycle number as the threshold for a magnetic encoder to be attached to a roller bearing for automobile wheel supporting (hub bearing) (hereinafter, referred to as "hub bearing magnetic encoder")), the material can be selected such that the ratio $\alpha e = (\alpha p - \alpha m)/\epsilon c$ is $1.1 \times 10^{-3}$/K or less.

In addition, in the configuration of the magnetic encoder 1 without an adhesive layer as a buffer, the support member 2 and the plastic magnet 4 are joined together through the use of molding shrinkage of the plastic magnet 4 and the wrap-around form of the plastic magnet 4, and thus the magnet material needs to have a prescribed value or more of strength.

Figure 7:
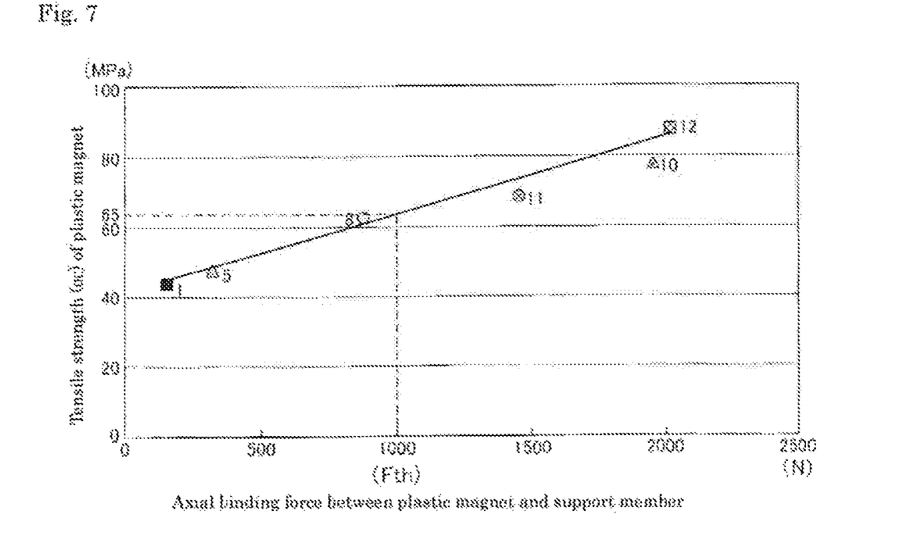
FIG. 7 is a diagram showing changes in the tensile strength ($\sigma c$) of the plastic magnet depending on axial binding force between the plastic magnet and the support member.

From this point of view, FIG. 7 is the plot of changes in the tensile strength ($\sigma c$) of the plastic magnet 4 with respect to the axial binding force between the plastic magnet 4 and the support member 2. FIG. 7 shows an upward tendency as indicated by a solid line. The reference numerals of the plot points in FIG. 7 correspond to those of the plot points in FIG. 8.

The axial binding force between the plastic magnet 4 and the support member 2 is determined such that, as shown as one example in the vertical cross-sectional view of FIG. 8, while the support member 2 is fixed, axial load is applied to the plastic magnet 4 and the magnitude of the load under which the plastic magnet 4 falls off from the support member 2 is measured.

Referring to FIG. 7, the selection of material for the annular plastic magnet 4 can be made under the condition that the material takes a value equal to or more than a value beginning at the threshold (Fth) based on the prescribed value of the axial binding force between the plastic magnet 4 and the support member 2.

Specifically, if the threshold (Fth) based on the prescribed value of the axial binding force between the plastic magnet 4 and the support member 2 is 1000N (control value which is set as the threshold for the hub bearing magnetic encoder), the material with the tensile strength ($\sigma c$) of 65 MPa or more can be selected.

Figure 3:
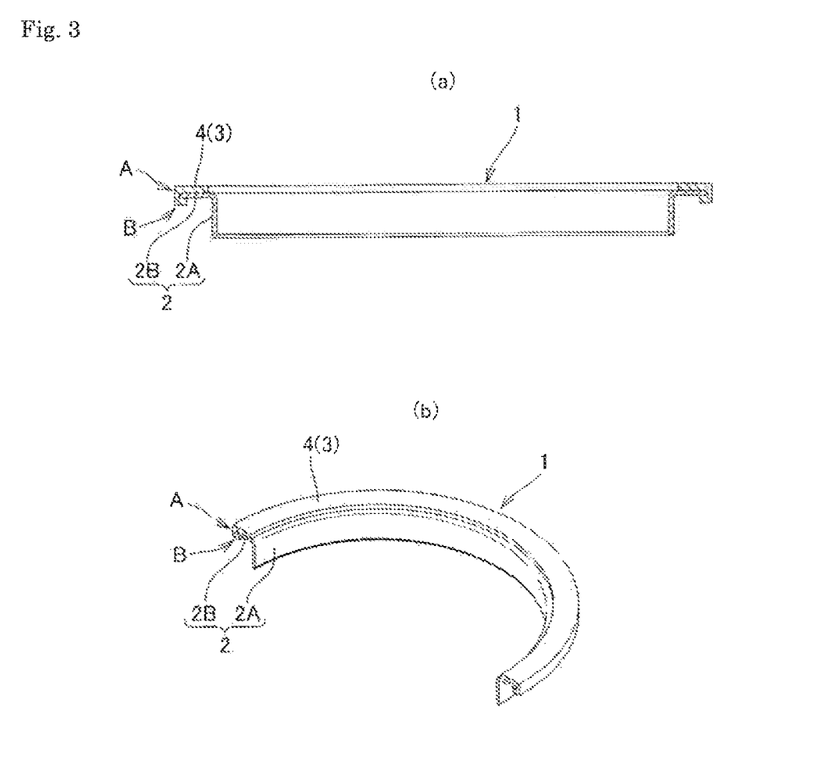
FIG. 3 shows the magnetic encoder according to the embodiment of the present invention.
Figure 4:
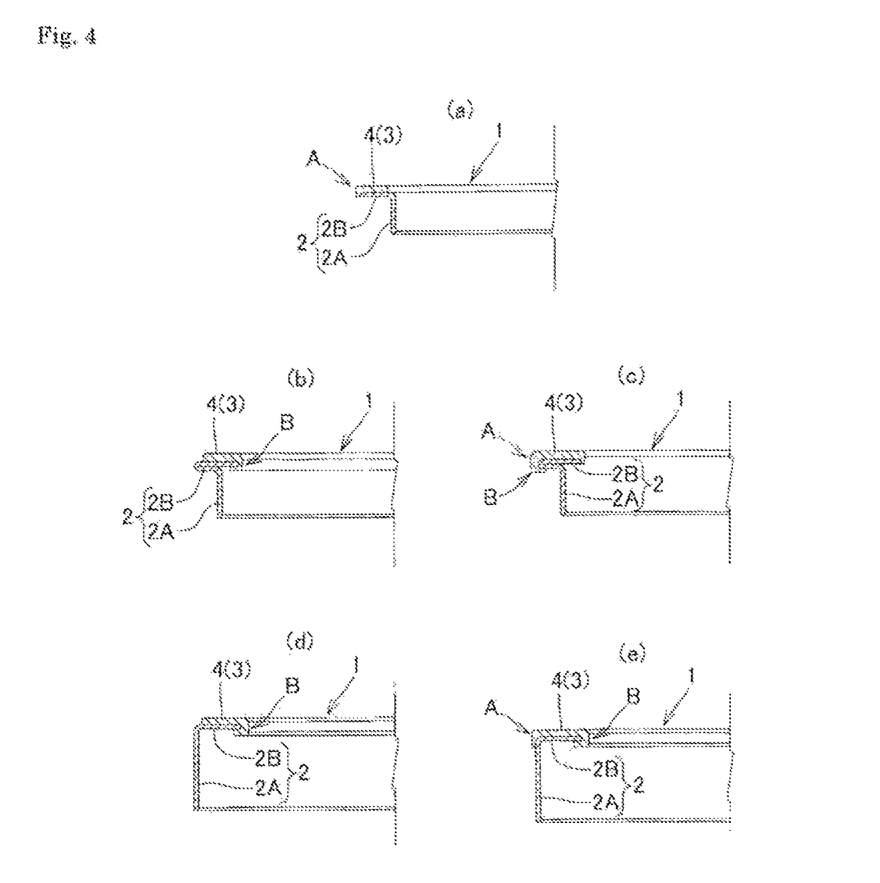
FIG. 4 is an enlarged vertical cross-sectional view of major components of an axial-type magnetic encoder, showing variations of joint form of a support member and a magnet member.
Figure 5:
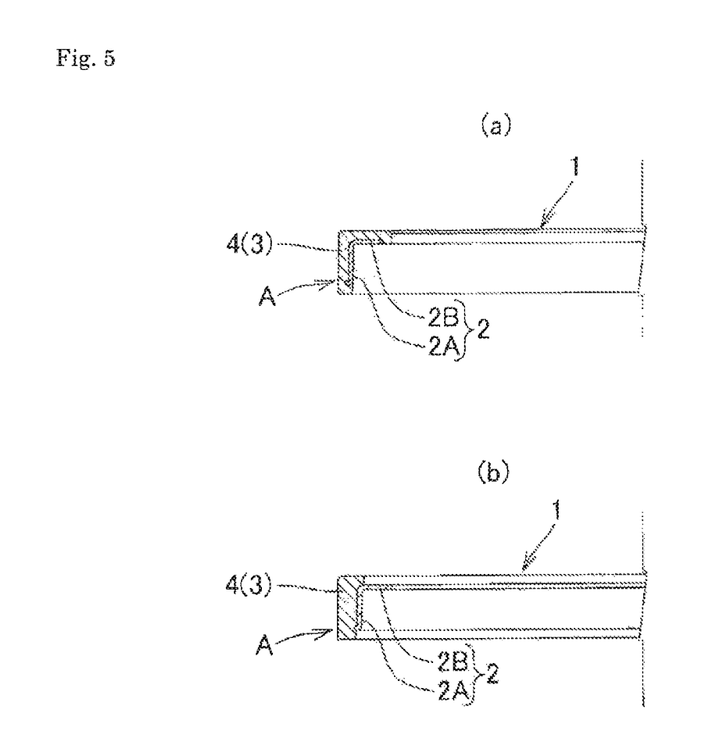
FIG. 5 is an enlarged vertical cross-sectional view of major components of a radial-type magnetic encoder, showing variations of joint form of a support member and a magnet member.

According to the configuration of the magnetic encoder 1 as described above, since there is no adhesive layer between the support member 2 and the plastic magnet 4, the support member 2 and the plastic magnet 4 are joined together by molding shrinkage of the plastic magnet 4 or wrap-around form of the plastic magnet 4 (refer to the joint portion A resulting from molding shrinkage and the joint portion B resulting from the wrap-around form shown in FIGS. 3 to 5), which eliminates the need for a process of applying a thermoset adhesive. This makes it possible to reduce manufacturing costs as compared to the configuration in which there is an adhesive layer between the support member 2 and the plastic magnet 4.

In addition, since the flange part 2B of the support member 2 has no radiation grooves or the like, the thickness of the annular magnet member 4 becomes uniform and the radially outer portion of the annular magnet member 4 does not warp upward. This makes it possible to prevent reduction in detection accuracy due to a pitch error or the like.

Further, since the difference ($\alpha p - \alpha m$) between the flowing-direction linear expansion coefficient ($\alpha p$) of the plastic magnet 4 and the linear expansion coefficient ($\alpha m$) of the support member 2 is small, even if the annular magnet member 4 does not have the wrap-around portion at the outer peripheral side but has the wrap-around portion at the inner peripheral side (for example, refer to FIGS. 4(b) and 4(d)), a shift of the plastic magnet 4 is suppressed with respect to the support member 2. This makes it possible to prevent reduction in detection accuracy due to a pitch error or the like.

Moreover, since the value of the ratio (($\alpha p - \alpha m$)/$\epsilon c$) of the difference ($\alpha p - \alpha m$) between the flowing-direction linear expansion coefficient ($\alpha p$) of the plastic magnet 4 and the linear expansion coefficient ($\alpha m$) of the support member 2 to the tensile breaking strain ($\epsilon c$) of the material for the plastic magnet 4 is equal to or less than the value beginning at the threshold (Nth) based on the prescribed value of the cycle number at thermal shock destructive test, the magnetic encoder 1 has a prescribed value or more of resistance to a thermal stress generated from thermal shock or the like.

In addition, since the value of the tensile strength ($\sigma c$) of the plastic magnet 4 is equal to or more than a value beginning at the threshold (Fth) based on the prescribed value of the axial binding force between the plastic magnet 4 and the support member 2, a prescribed value or more of strength is assured in the configuration in which the support member 2 and the plastic magnet 4 are joined together through the use of molding shrinkage of the plastic magnet 4 and the wrap-around form of the plastic magnet 4.

Accordingly, in the configuration in which there is no adhesive layer as a buffer and the support member 2 and the plastic magnet 4 are joined together through the use of molding shrinkage of the plastic magnet 4 and the wrap-around form of the plastic magnet 4, a prescribed value or more of stress (strain) does not occur at or break the annular plastic magnet 4 even in the usage environments with great temperature changes.

In particular, in the hub bearing magnetic encoder configured such that the magnet member 3 is the plastic magnet 4, there is no adhesive layer between the support member 2 and the plastic magnet 4, and the support member 2 and the plastic magnet 4 are joined together through the use of molding shrinkage of the plastic magnet 4 and the wrap-around form of the plastic magnet 4, the material for the plastic magnet 4 is preferably selected under the conditions that the ratio $\alpha e \leq 1.1 \times 10^{-3}$/K and the tensile strength $\sigma c \geq 65$ MPa or more.

In the foregoing description, the magnetic encoder 1 is configured to be attached to the inner ring 12 as a rotating body. In the case of using the magnetic encoder 1 for the bearing for rotation of the outer ring, the magnetic encoder 1 can be attached to the outer ring as a rotating body.

In addition, the magnetic encoder 1 described above can be used in combination with a seal member. For example, the magnetic encoder 1 can be used as an encoder-equipped seal member as shown in FIG. 1 of Patent Document 1.

REFERENCE SIGNS LIST

1 Magnetic encoder
2 Annular Support member
2A Cylindrical part
2B Flange part
3 Annular magnet member
4 Annular plastic magnet
5 Protective cover
6 First cylindrical part
7 Second cylindrical part
8 Annular part
9 Seal body
10 Sensor
11 Bearing device
12 Inner ring
12A Inner ring track surface
13 Outer ring
13A Outer ring track surface
14 Rolling element
15 Seal member
A Joint portion resulting from molding shrinkage
B Joint portion resulting from wrap-around form

The invention claimed is:

1. A magnetic encoder comprising:
an annular support member that is formed from a steel plate and attached to a rotating body; and
an annular magnet member that is fixed to the support member and has N and S poles magnetized circumferentially at regular intervals in a multipolar manner, wherein
the magnet member is a plastic magnet,
there is no adhesive layer between the support member and the plastic magnet, and the support member and the plastic magnet are joined together by molding shrinkage of the plastic magnet or wrap-around form of the plastic magnet, and
the material for the plastic magnet is selected such that the value of the ratio (($\alpha p - \alpha m$)/$\epsilon c$) of a difference ($\alpha p - \alpha m$) between flowing-direction linear expansion coefficient ($\alpha p$) of the plastic magnet and linear expansion coefficient ($\alpha m$) of the support member, to tensile breaking strain ($\epsilon c$) of the material for the plastic magnet is equal to or less than a value beginning at a threshold (Nth) based on a prescribed value of cycle number at thermal shock destructive test, and tensile strength ($\sigma c$) of the plastic magnet is equal to or more than a value beginning at a threshold (Fth) based on a prescribed value of axial binding force between the plastic magnet and the support member, and wherein the magnetic encoder is an axial type, and includes a joint portion resulting from molding shrinkage at a radially outer peripheral part of the plastic magnet and includes a joint portion resulting from wrap-around from a radially inner peripheral part of the plastic magnet.

2. A bearing device comprising the magnetic encoder according to claim 1, wherein the rotating body is an inner ring of a bearing, and the bearing device further includes a cup-shaped protective cover that is press-fitted into an outer ring of the bearing as a non-rotating body to cover the magnetic encoder.

* * * * *